(12) United States Patent  (10) Patent No.: US 7,390,210 B2
Corona  (45) Date of Patent: Jun. 24, 2008

(54) ELECTRICAL CONNECTOR WITH HIGH IMPACT STRENGTH LOCKING ASSEMBLIES

(75) Inventor: Sergio Corona, Upland, CA (US)

(73) Assignee: DSM&T Company Inc., Fontana, CA (US)

( * ) Notice: Subject to any disclaimer, the term of this patent is extended or adjusted under 35 U.S.C. 154(b) by 0 days.

(21) Appl. No.: 11/594,318

(22) Filed: Nov. 8, 2006

(65) Prior Publication Data

US 2008/0108243 A1    May 8, 2008

(51) Int. Cl.
    *H01R 13/52*    (2006.01)
(52) U.S. Cl. ...................................... 439/281
(58) Field of Classification Search ................ 439/278, 439/281, 283, 286, 275, 276; 29/856–858
    See application file for complete search history.

(56) References Cited

U.S. PATENT DOCUMENTS

| | | | |
|---|---|---|---|
| 4,772,231 A | 9/1988 | Hayes | |
| 4,917,625 A * | 4/1990 | Haile | 439/358 |
| 5,183,413 A | 2/1993 | Lazaro, Jr. | |
| 5,387,119 A | 2/1995 | Wood | |
| 5,401,181 A | 3/1995 | Wilson | |
| 5,890,922 A | 4/1999 | Buchter | |
| 6,053,754 A | 4/2000 | Kano | |
| 6,379,169 B1 | 4/2002 | Corona | |
| 6,383,003 B1 | 5/2002 | Corona | |
| 6,435,911 B1 | 8/2002 | Payson | |
| 6,749,454 B2 | 6/2004 | Schmidt | |
| 6,855,006 B2 | 2/2005 | Brooks | |
| 6,929,516 B2 | 8/2005 | Brochu | |
| 7,044,762 B1 | 5/2006 | Hong | |
| 7,078,624 B1 * | 7/2006 | Stewart | 174/66 |
| 2004/0171314 A1 | 9/2004 | Lappohn | |
| 2005/0106949 A1 | 5/2005 | Lappohn | |
| 2006/0105629 A1 | 5/2006 | Hayashi | |
| 2006/0148331 A1 | 7/2006 | Rimke | |

* cited by examiner

*Primary Examiner*—Alexander Gilman
(74) *Attorney, Agent, or Firm*—Keusey, Tutunjian & Bitetto, P.C.

(57) ABSTRACT

A weather-resistant electrical connector having an environmental seal and including a locking assembly made from a high impact strength thermoplastic. A method is disclosed for overmolding the connectors in one step. A locking yoke latches the connectors together. Locking tabs secure the connectors to mounting plates. The locking tabs have steps to retain the connectors upon compression of a seal. An insulated mounting post supports the contact and is of sufficient length to seal and contain any arcs from live connections.

30 Claims, 7 Drawing Sheets

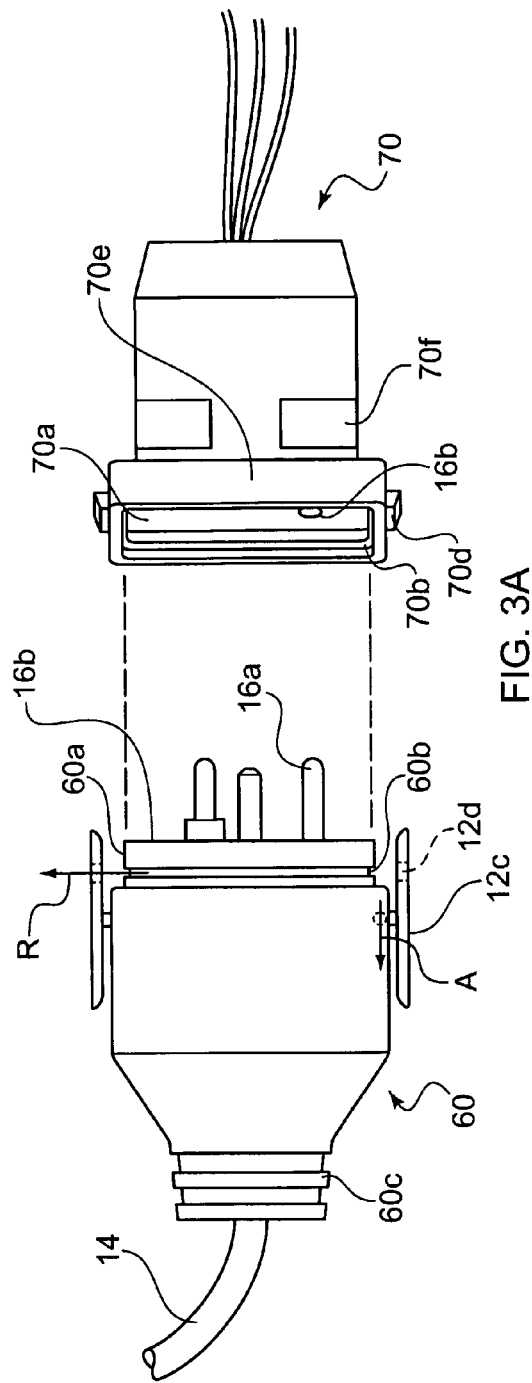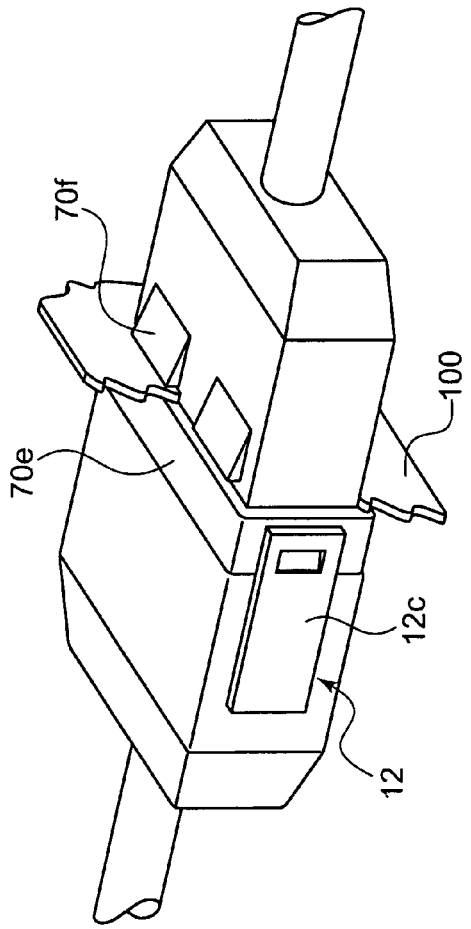
FIG. 3A
FIG. 3B

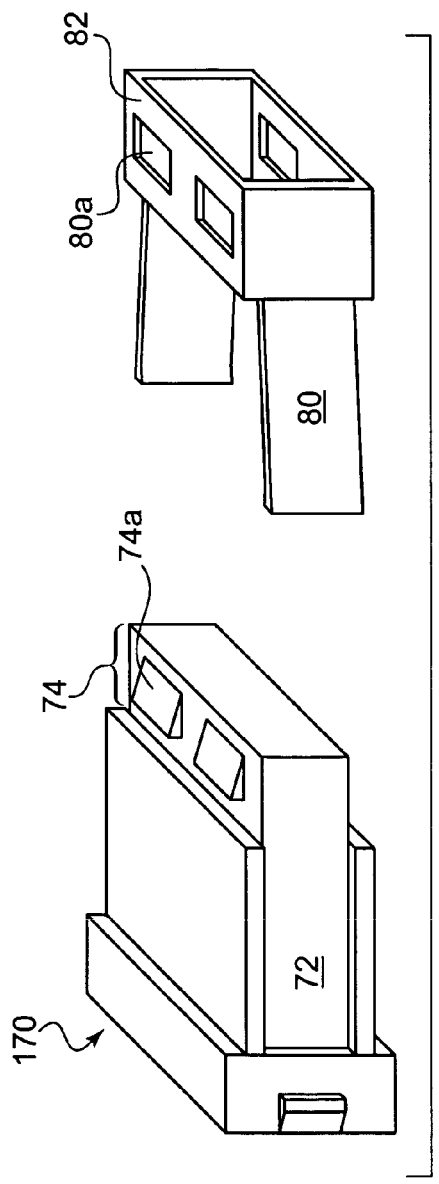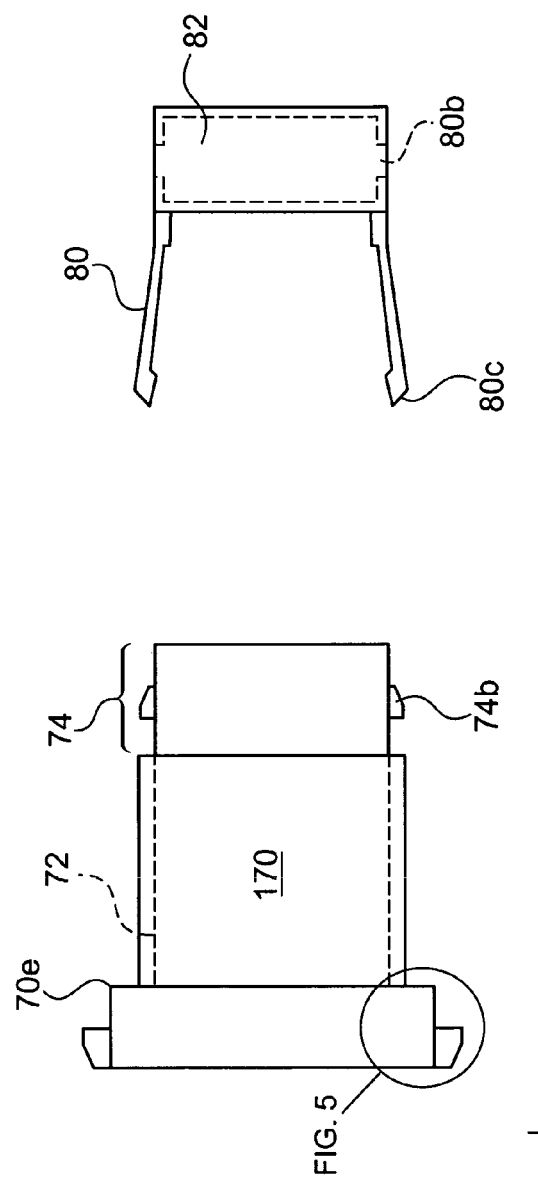

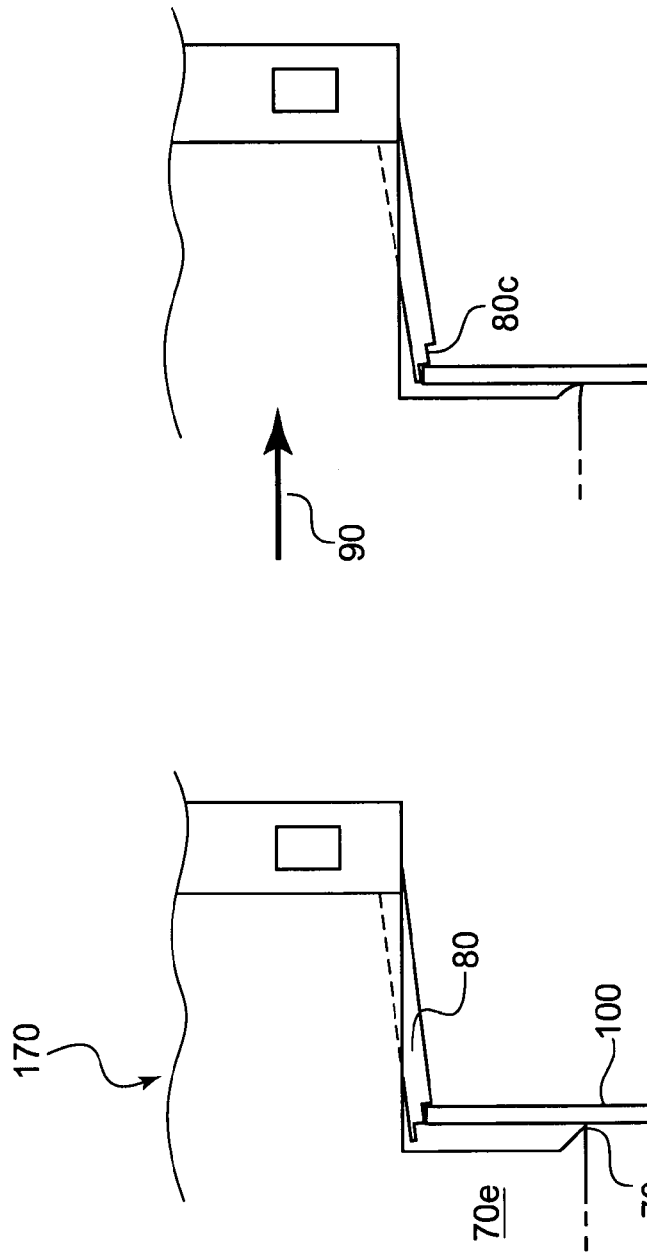

ELECTRICAL CONNECTOR WITH HIGH IMPACT STRENGTH LOCKING ASSEMBLIES

BACKGROUND OF THE INVENTION

1. Field of the Invention

The present invention relates to a method and apparatus involving overmolded, weather resistant electrical connectors having locking assemblies made from a different high strength and flexible material.

2. The Prior Art

Plug and receptacle bodies can be made from a variety of methods, including overmolding a dielectric material around the wires and contacts. Improvements in the basic design add features on to the overmolded body. One example is commonly owned U.S. Pat. No. 5,401,181, the entire content of which are incorporated herein by reference thereto. This patent is incorporated by reference to provide a description of the fluid sealing feature.

In order to improve the integrity of the electrical connection, manufacturers began adding latching assemblies. One example is commonly owned U.S. Pat. No. 6,379,169 which adds overmolded latch parts to each connector. Another example is commonly owned U.S. Pat. No. 6,383,003 which adds an overmolded latch to one connector for securing to the mounting plate.

All of the above referenced designs use only dielectric materials in the plug body. Furthermore they all utilize one-way ramps to attach onto the mounting plate. That is, the plate aperture edge rides up and over the ramp to a groove that captures the plate edge. Removing these connectors requires a difficult step of compressing the plug body to allow the ramps to clear the aperture. The removal process may place undue torque or force on the mounting plate causing it to bend out of shape or crease.

Accordingly, a need exists to provide a simplified manufacturing process that maintains the beneficial waterproof seal while incorporating latching and mounting fixtures with improved mechanical properties.

SUMMARY OF THE INVENTION

It is an object of the present invention to provide a weather proof electrical connector with high impact strength locking assemblies.

It is a further object of the present invention to provide a simplified method for manufacturing such a connector with a single overmolding step.

It is another object to provide a post-mounted contact for making an electrical connection within a sealed compartment.

These and other related features are provided in a water tight electrical connector assembly having a male connector and a female connector with a mating seal formed cooperatively upon connection of the male connector to the female connector. One of the connectors includes locking tabs and the other connector includes a locking yoke, electrical contacts and an overmold body.

The locking yoke is made from an impact resistant thermoplastic having a bit portion with opposed ends and locking arms integrally formed on either end of the bit portion. The electrical contacts form terminating ends of the wires. A dielectric thermoplastic overmold body including a portion of the mating seal at the proximal end thereof, encases the bit portion and the electrical contacts. The locking arms extend outside the body with a degree of flexibility so that the arms are capable of engaging and disengaging the locking tabs on the mating connector.

The bit portion comprises a C shaped retention band that is configured and designed to pass around, and partially encircle, the electrical contacts. The retention band and the electrical contacts are held in a spaced relationship during formation of the overmold body. The yoke includes pivot plates between the bar and the locking arms. The pivot plates pass through the exterior surface of the overmold body. The impact resistant material forming the locking yoke has a tensile strength at yield of between about 7,500 psi to about 10,500 psi according to ASTM D638. The locking arms are connected to the pivot plates at a midpoint thereof to provide a lever for pivoting the locking arms off of the tabs. The impact resistant material forming the locking yoke has a tensile strength at yield of between 3 and 20 times greater than the dielectric material forming the overmold body. The impact resistant material is selected from the group consisting of nylon 66 and polycarbonate, and the dielectric material is selected from the group consisting of PVC, TPR and TPE.

The connectors each include one of a complementary shaped extension or cavity, both having lateral surfaces, and wherein said mating seals are formed on lateral surfaces. The retention band is axially aligned with the lateral surfaces. The retention band is axially aligned with the seal. The locking arms and the locking tabs engage at a location that is radially aligned with said lateral surfaces.

For installation onto a mounting plate, there is one connector with a shoulder and tabs adapted to resiliently compress for passing through a face plate aperture and then expand to capture the face plate between the shoulder and the tabs. We provide flexible arms that carry and bias the tabs outwardly into a face plate contacting configuration. The installed connector is provided with channels underneath the flexible arms, wherein the flexible arms are adapted to be depressed into the channels to clear the face plate aperture for removal of the connector. To mount the arms, there is an attachment assembly having a capture block integrally formed with the flexible arms. The capture block releasably secures the attachment assembly to the one connector. Both connectors are made from a dielectric thermoplastic material. The one connector is overmolded to include a bead extending around the shoulder for sealing engagement with the plate. The tabs include a stepped profile to increase the pressure of the bead against the plate so that the bead forms and O-ring type seal meeting standard IP65. The bead comprises a tapered lip about 0.01 inches in height and extending off the shoulder in the direction of the tabs. The attachment assembly is made from an impact resistant thermoplastic material having a tensile strength at yield of between about 7,500 psi to about 10,500 psi according to ASTM D638. The locking yoke and the attachment assembly are made from the same impact resistant material. The capture block includes windows and the connector includes engagement tabs at a distal end thereof, to latch into the windows of said capture block.

In the arc containing embodiment, there are posts integrally formed with the overmold body for supporting the electrical contacts. The posts have a length that is greater than the length of the electrical contacts. The posts have a section of uniform cross sectional shape and area that is longer than said electrical contact. The posts includes a base section having a frusto-conical shape. The one connector has a sleeve and female contact correspondingly shaped and dimensioned to receive said post and said electrical contact. The post occupies the sleeve opening to enclose the contacts before they enter within arcing range.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views:

FIGS. 3A and 3B show the overmolded plug body with a first embodiment of a receptacle.

FIG. 4A illustrates a second embodiment of the receptacle.

FIG. 4B illustrates a third embodiment of the receptacle.

FIG. 5 is an enlarged, cross-sectional view of a portion of the receptacle from FIG. 4B showing a sealing bead.

FIGS. 6A and 6B are progressive views illustrating compression of the sealing bead from FIG. 5 between the receptacle flange and the mounting plate.

DETAILED DESCRIPTION OF PREFERRED EMBODIMENTS

The present invention incorporates locking assemblies made from selected engineering resins into an overmolded plug body for improved performance. Through careful design of the locking assemblies, a weather resistant electrical connector with improved functionality can be manufactured with a single overmolding step.

A variety of electrical connectors are known, for example, mini spa plugs and connectors for evaporative cooling applications. Our prior designs have provided mating seals to restrict moisture from penetrating the electrical contact areas. However, upgrading or maintaining the equipment frequently requires the electrical connectors to be removed or replaced. The material used to form the plug body and the receptacle body is chosen for its dielectric properties. The material's mechanical properties including excellent flex fatigue resistance make it ideal for sealing. In addition, the electrical connectors typically lock to each other and latch onto a mounting plate. However, the overmolding process and the somewhat resilient materials used for forming the plug body, are generally unsuited for creating thin, flexible locking or latching arms.

References to a plug body and receptacle body may be used interchangeably. In general, the devices discussed herein include a mating pair. One half of the pair features a protruding block. For the sake of consistency, we refer to this block as the "male" or "plug". The other half of the pair features a recess for receiving the block. For the sake of consistency, we refer to the recess as the "female" or "receptacle". The block and the recess are cooperatively shaped to contact each other along facing surfaces as well as a peripheral, lateral surface. One lateral surface features a bead or groove. The other lateral surface includes a corresponding groove or bead. The mating of the bead into the groove provides the water tight seal to the electrical contacts which are made axially across the facing surfaces. Either the plug or the receptacle may carry male or female contacts, or both.

Figure 1:
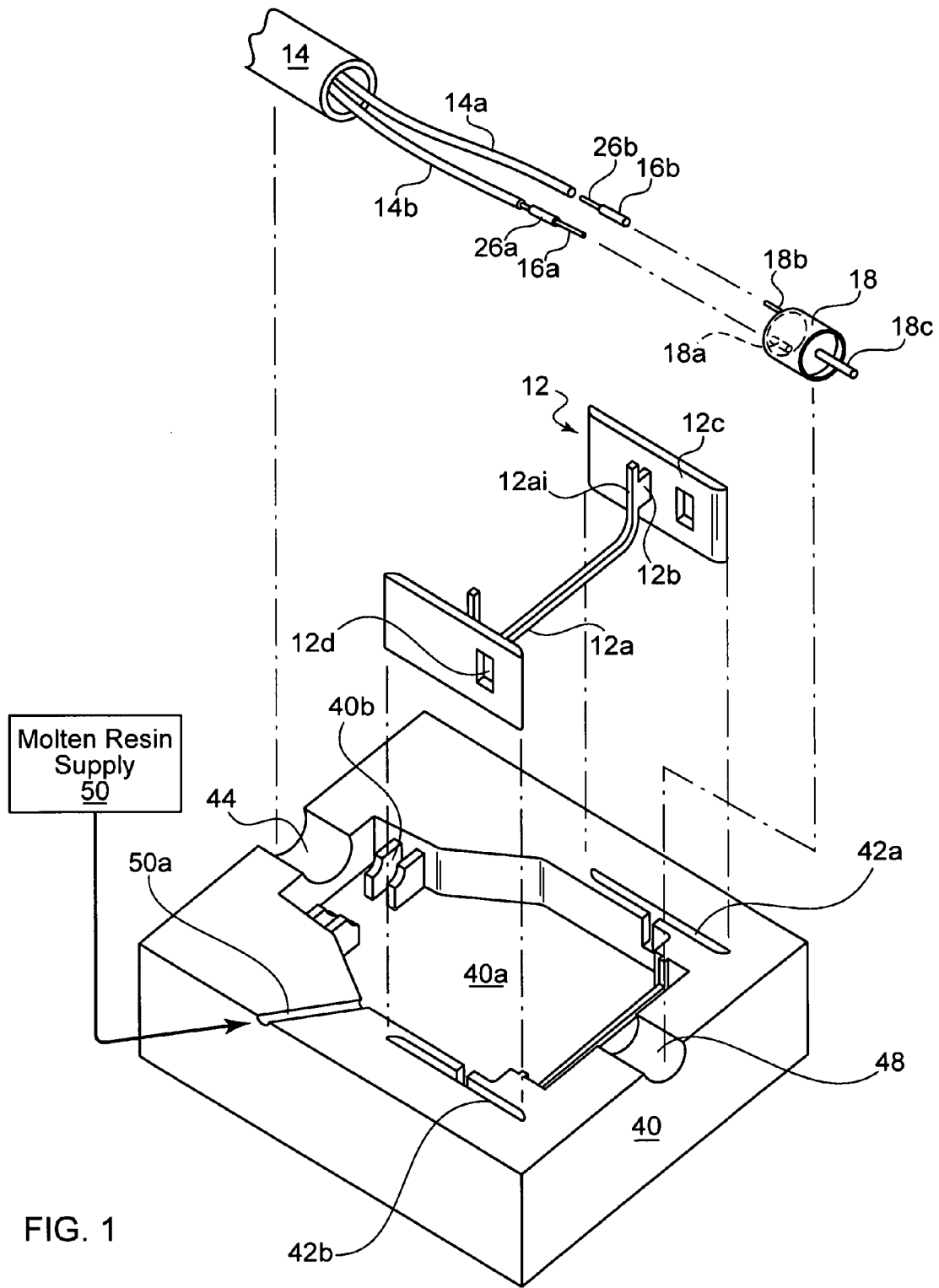
FIG. 1 is an exploded view illustrating the placement of a locking yoke and electrical contacts into a mold prior to overmolding the plug body.
Figure 2:
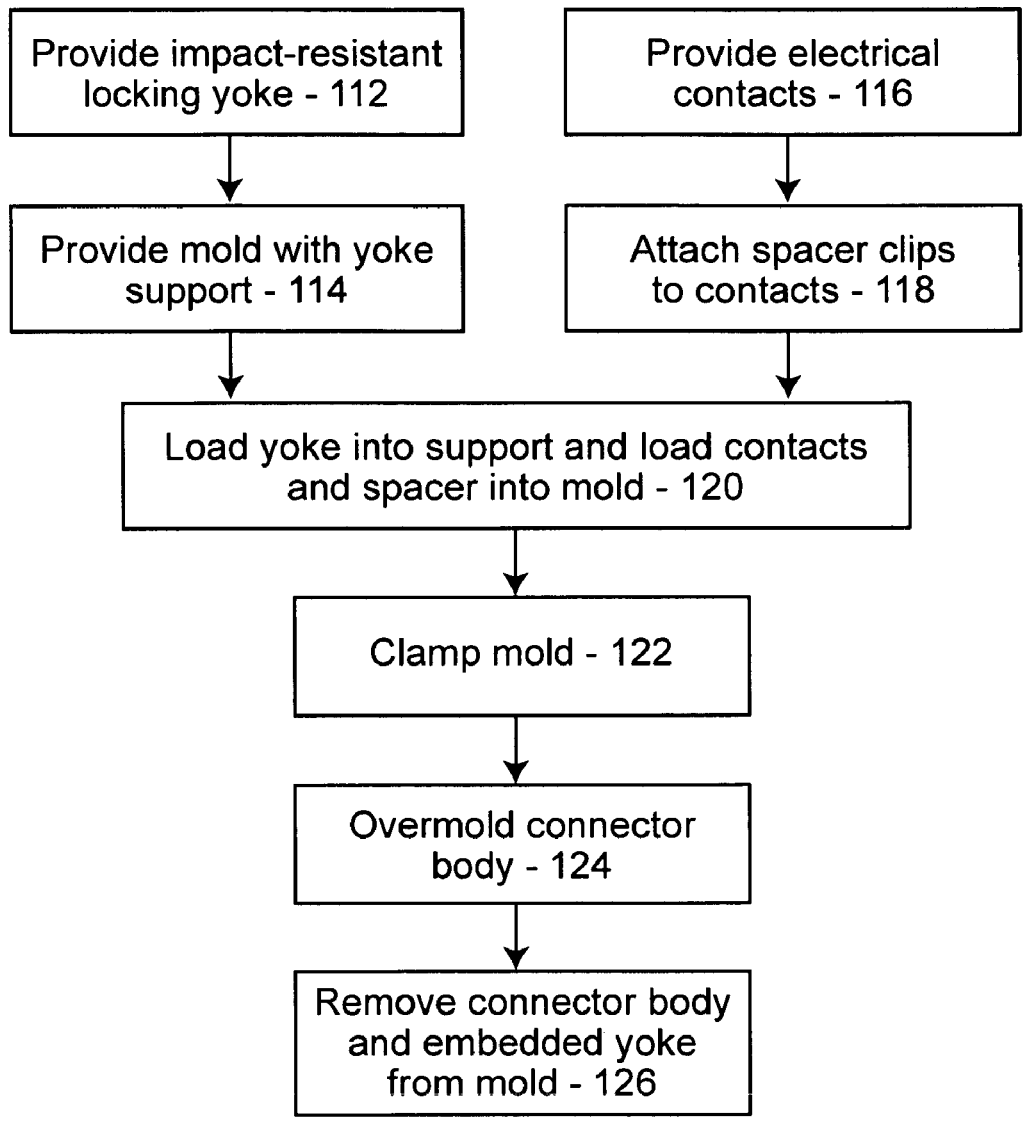
FIG. 2 is a flowchart outlining the method steps for manufacturing an electrical connector according to an embodiment of the invention.

An embodiment of a method for manufacturing a plug body will now be described with reference to FIGS. 1 and 2. FIG. 1 shows a mold half, for example, the lower stationary mold half 40. A cavity 40a will receive the molten overmold material and defines the shape of the solidified overmolded part.

Adjacent cavity 40a are various support features to retain elements in a particular location during injection of the overmold material. Along the wire axis, a wire support 44 holds a multiconductor wire 14 and a spacer support 48 holds a contact spacer 18. A wire strain relief is formed around multiconductor wire 14 in the upper left hand corner of cavity 40a. Several pairs of fins 40b are shown. Cavity 40a may include two right fins and two left fins, with complementary sets in the other mold half. Contact spacer 18 is equipped with male holder elements 18a for male contacts 16a, and female holder elements 18b for female contacts 16b. One holder element may be provided for each contact. The contacts are attached by crimps 26a and 26b to the stripped ends of stranded wires 14a and 14b. Handle 18c may extend outside the mold where it can be held by the operator or retained in an appropriate fixture. A stop or other alignment means may be provided to reproducibly locate contact spacer 18 flush with the interior wall of cavity 40a. The spacing of the holder elements determines the configuration of the contacts in the solidified overmold body. For the receptacle, a mirror image holder element is provided with the opposite contact in each location, so that each contact on the plug will be aligned with a mating contact on the receptacle.

Radially outward from the wire axis, a pair of yoke supports 42a and 42b are formed adjacent the cavity 40a. Locking yoke 12 has a T-shaped portion that will be located outside the overmold body. The top of the T constitutes a locking arm 12c and the stem of the T constitutes pivot plat 12b. Pivot plate 12b will be partially encased within the overmold body and partially exterior of the body. The exterior part of pivot plate 12b along with locking arm 12c fit into yoke supports 42a and 42b. Since the support features are completely occupied by their corresponding elements, they form a seal to contain the molten overmold material within the cavity 40a.

A method of forming an electrical connector according to an embodiment of the invention will now be described in connection with the flowchart of FIG. 2. In step 112, there is provided an impact resistant, and flexible, locking yoke 12. For example, locking yoke may be formed by injection molding polycarbonate or nylon 66. In step 114, the mold is provided with yoke supports 42a and 42b.

In step 116, electrical contacts are provided, and in step 118, there is provided a contact spacer 18. In step 120, the yoke and contact spacer are loaded into the mold. FIG. 1 depicts yoke with its retention band 12a along the bottom. In this orientation, the yoke would be loaded into the mold first, with wire 14, its contacts, and spacer 18 then extending over and across band 12a. If wire 14 is loaded first, then yoke 12 can be flipped 180 degrees so that band 12a extends over and across the wires.

The moveable top mold half is then clamped down in step 122 to completely define the molding cavity. Top mold half will include a mold tool similar in all respects to the lower mold half shown. With support openings 42, 44 and 48 occupied by the various components, cavity 40a takes on its closed volumetric shape. Molten resin, from a source 50, is then injected into the cavity in step 124. Source 50 may be a heated barrel and screw arrangement or similar device for rendering thermoplastic into a molten state above its glass transition temperature. The mold may be equipped with a hot runner 50a or valves or other controls to adjust the volume or flow rate of resin into the mold cavity. After a period of several seconds, up to about 1-2 minutes, the top moveable mold half opens and the overmolded connector is removed in step 126.

With regard to materials, the overmold body is formed from a thermoplastic resin material suitable for injection overmolding. The resins can be processed in the injection molding machine at temperatures ranging from 300 to 480 degrees F. In general the material will possess weather resistant properties, including UV, ozone, flex and fluid resistant properties. The material will be a so-called dielectric material, since it will be in intimate contact with the electrical contacts. The dielectric constant of suitable materials will be in excess of 2 units, for example, between 2 and 3 units. The dielectric strength will exceed 18 kV/mm, and may be, for example, between 19 and 20 kV/mm. Such materials meeting these requirements, have a relatively low tensile strength, between 1000 and 2500 psi, according to ASTM D 412. The materials will have a relatively high service temperature, in the range of 250 to 300 degrees F.

The classes of suitable resins may include, PVC, thermoplastic rubber (TPR) and thermoplastic elastomer (TPE). For example, PVC designated V2-8 having a tensile strength of 2350 psi or V2-9 having a tensile strength of 1900 psi may be used. For TPR examples, Santoprene® 101-80 or 201-80 both having a dielectric constant of 2.3; dielectric strength of 19.6 kV/mm (500 v/mil); tensile strength, ultimate of 1640 psi; a processing temperature of 351-450 degrees F.; and a maximum service temperature, air of 275 degrees F., may be used. For a TPE example, Evoprene® G 975 having a tensile strength, ultimate of 1940 psi; a processing temperature of 340-376 degrees F.; and a maximum service temperature, air of 264 degrees F., may be used.

The locking assemblies are formed from a thermoplastic resin material suitable for injection molding or other thermoforming techniques. The resins can be processed in the injection molding machine at temperatures ranging from 500 to 620 degrees F. In general the material will possess weather resistant properties, including UV, ozone, flex and fluid resistant properties. The material will be a so-called high impact strength material. The dielectric constant of suitable materials will be in excess of 2 units, for example, between 2.8 and 3.8 units. The dielectric strength will exceed 350 V/mil, and may be, for example, between 375 and 450 V/mil. Such materials meeting these requirements, have a relatively high tensile strength, between 7,000 and 12,000 psi, according to ASTM D 638. The materials will possess relatively high service temperature, in the range of 200 to 275 degrees F.

The classes of suitable resins may include, polycarbonate and nylon 6/6. For example, polycarbonate designated LEXAN® 940 from GE having a dielectric constant of 3; dielectric strength of 425 V/mil; a tensile strength at yield of 9,000 psi and a tensile strength at break of 8,100 psi may be used. For nylon 6/6 examples, Frianyl A63 V0 Nylon having a tensile strength, ultimate of 11,600 psi; and a maximum service temperature, air of 257 degrees F., may be used. Another nylon, POLYPENCO® type 6/6 polyamide having a tensile strength, ultimate of 11,500 psi; a dielectric constant of 3.6; a dielectric strength, short term of 400 V/mil; and a maximum service temperature, air of 210 degrees F., may be used.

The overmold materials have excellent flex fatigue resistance and high elongation at break values (300 to 550%), making them durable and somewhat resilient to protect the electrical connections therein from the elements, vibration and other shock. However, the locking assembly materials, having a low elongation at break of only 5% and high impact strength, are ideal for keeping the connectors locked together and installed on the mounting plate. With the locking arm embedded within the overmold body, a synergistic effect is created from the combination of materials. The connector bodies can flex and elongate around the embedded locking yoke, without stretching or otherwise effecting the locking yoke itself. The embedded section of the locking yoke is referred to as a bit portion. Both the locking arms and the overmold body have similar high operating temperatures.

To summarize the method according to the invention:

Form, thermoform or injection mold the locking yoke from a high impact strength material having a tensile strength exceed 7,000 psi;

Provide a yoke support within the mold;

Provide electrical contacts onto the ends of the individual wires;

Attach spacer clips to the electrical contacts;

Load the locking yoke and the contacts with spacer into the mold;

Overmold the connector body with a dielectric material having an ultimate elongation exceeding 400%; and Removing the connector body with embedded locking yoke from the mold to provide a connector with all parts having a maximum service temperature exceeding 200 degrees F. The locking yoke has a tensile strength, depending on the combination of materials, that is 5× to 10× greater than the overmold material.

The product according to the invention is presented in a first embodiment in FIGS. 3A and 3B. The completed male connector 60 is shown with a male mating extension 60a at the proximal end and a strain relief 60c at the distal end. One part of the moisture seal extends circumferentially around the lateral surface of the extension. For example, the figure shows the moisture seal recess 60b formed on the male mating extension 60a. The female contact 16b or crimp 26a resides within male mating extension 60a, with the wires 14a and 14b extending back, generally in an Axial direction A, and converging by the time they exit at multi-conductor wire 14.

Retention band 12a and the band ends, represented by 12ai, are curved along a path that is very similar to the exterior contour around three sides of male mating extension 60a.

FIG. 3A shows arrow A passing adjacent the lateral side of 60a and passing through band end 12ai. By adjusting the width of band 12a and the band ends, it is possible to have them axially aligned behind recess 60b, or to have the band and the recess terminate along a common axial plane or surface. That is, the band extends into the connector no farther than the depth of the recess. Since the contact 16b or crimp 26a is disposed a slight distance inwardly of the recess, the band placement in alignment with the recess insures clearance of the wires within the connector body. When assembled, band 12a and band ends 12ai would also be axially aligned with the lateral surface of female mating cavity 70a and sealing bead 70b. For example, the lateral surface of extension 60a may be axially aligned with the center of the band. The band and pivot plate may have a thickness of between 0.04 and 0.08 inches, for example, 0.06 inches. In polycarbonate, this thickness range provides good stiffness, while allowing pivoting with a reasonable amount of manual force. In the other dimensions, the pivot plate my be 0.13 by 0.25 inches.

Locking arms 12c extend parallel to the Axial direction A. FIG. 3A shows the arms extending slightly passed the extension 60a. The ends of the locking arms along with locking pegs 70d may be complementarily tapered so that during the connection process, the locking arms are spread open. Once window 12d clears the back end of peg 70d, locking arms spring back to their original, parallel position, latching the connectors together. The locking arms are spaced from the connector body so that the rear portions thereof can be squeezed together, pivoting the front portions open, and allowing the window 12d to be unlatched from the locking peg 70d.

As shown in the right hand side of FIG. 3A, the overmolded female connector 70 includes a female mating cavity 70a carrying along its lateral surface the other part of the moisture seal, in this example, the moisture seal bead 70b. Surrounding and defining the cavity is a flange 70e. At a preset distance behind the flange are the ramp tabs 70f. As can be seen in FIG. 3B, connector 70 is installed on a mounting plate 100, whereby the plate is sandwiched between a shoulder of flange 70e and ramp tabs 70f.

Flange 70e is dimensioned in the axial direction to provide clearance for pivoting arms 12c to latch and unlatch onto pegs 70d without interfering with plate 100. Each window and peg set are aligned along a Radial direction R. As can be seen in FIG. 3A, a particular arrow R can be drawn from extension 60a, through the recess 60b and continuing to window 12d. When connected, the arrow R would also pass through flange 70e and bead 70b. This adds to the integrity of the seal when subject to torsional forces, since the latch is on a direct radial path with the environmental seal.

An improvement according to the invention provides thin flexible arms 80 for engaging the mounting plate, as can be seen in FIGS. 4A and 4B. The connector 170 has a narrowed body 74 with engagement tabs 74a for receiving a capture block 82. FIG. 4A shows engagement tabs 74a for slots 80a, while FIG. 4B shows edge tabs 74b for edge slots 80b. The capture block 82 may be integrally formed with flexible arms 80, for example, injection molded from the same material that forms the locking yoke. Also along the edge of both connectors are channels 72. While arms 80 are biased in an outwardly direction, they can be pressed into channels 72 to clear the mounting panel for easy removal of the connector.

At the end of arms 80, there is provided a stepped profile 80c. At the facing corner of flange 70e is a sealing bead 70g, for example a triangular profile extending back off the shoulder of the flange, as shown in FIG. 5. The sealing bead may have a height of 0.005 to 0.015 inches. In one embodiment, the height of the bead is 0.010 inches. FIG. 6A shows connector 170 mounted onto mounting plate 100 with retention being provided by the furthest step of profile 80c. As the mating connector is attached, a connector mating force 90 is created in a direction to the right. This causes a compression of sealing bead 70g as shown in FIG. 6B. As the plate clears the second step of profile 80c, one or both of the flexible arms spring outward to the final position shown in FIG. 6B. The compression of bead 70g forms an O-ring type seal around the entire periphery of flange 70e meeting standard IP65.

Figure 7A:
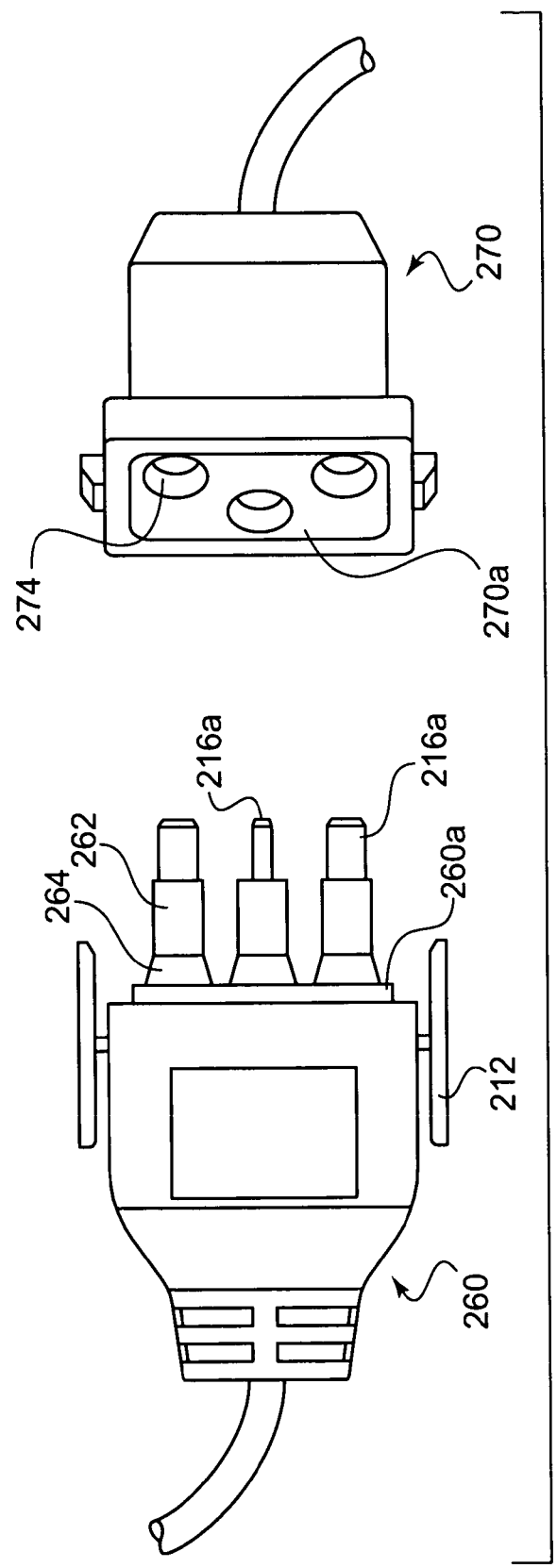
FIG. 7A is a perspective view showing a further embodiment of the overmold plug body with a mating receptacle.
Figure 7B:
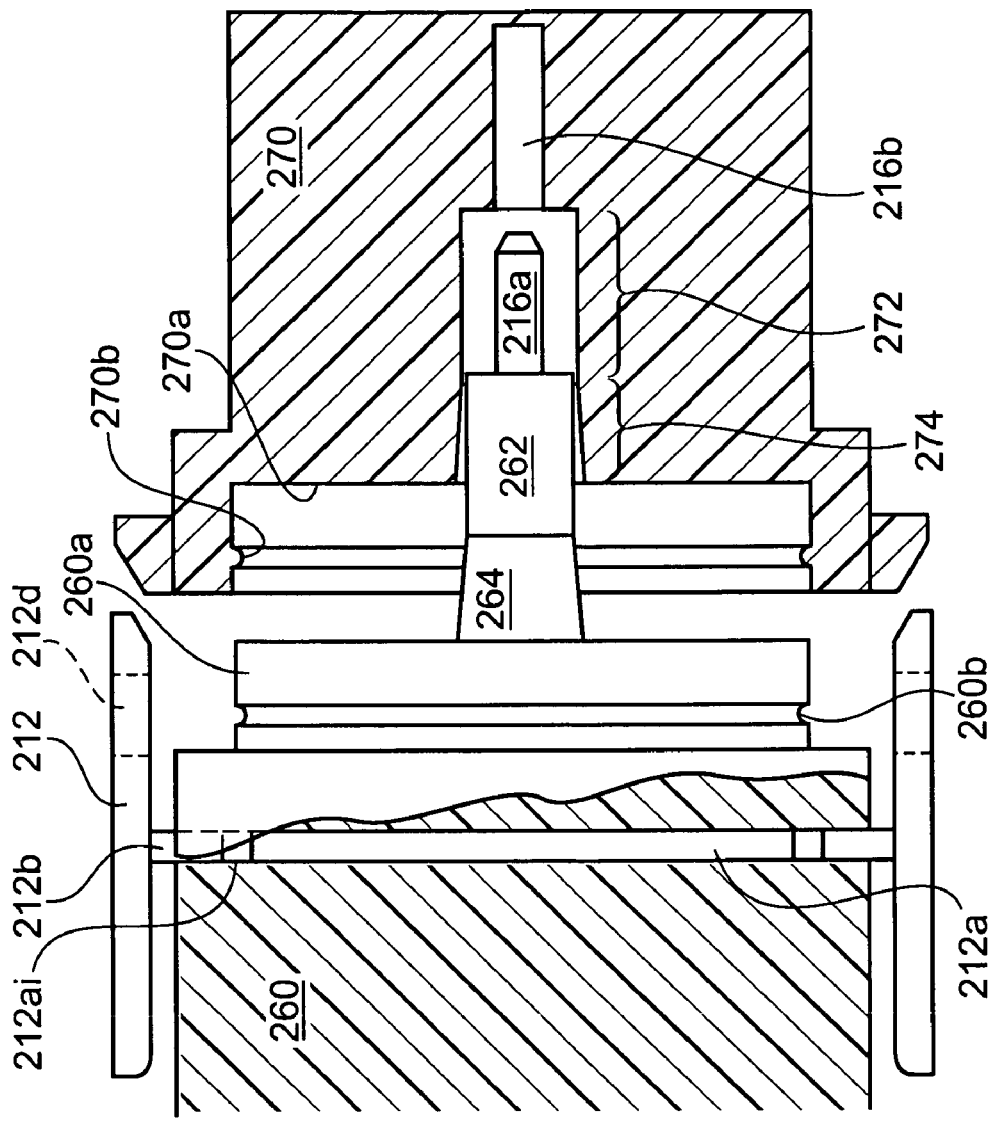
FIG. 7B is a cross-sectional view of the connectors from FIG. 7A.

A further application for the high impact strength locking arms in a connector set is shown in FIGS. 7A and 7B. Starting from the left side of the figures, male connector 260 represents an overmold body that envelopes a locking yoke 212 and insulated wires. A male mating extension 260a is provided with a moisture seal recess 260b. As previously described, retention band 212a and ends 212ai may be axially aligned with the lateral surface of extension 260a or the bottom of recess 260b. When connected, the lateral surface of cavity 270a, and bead 270b would also be aligned. Window 212d may be radially aligned with recess 260b. When connected, window would also be radially aligned with bead 270b. For certain applications, including indoor applications, it would be possible to omit the bead and recess while still incorporating the features described below.

While other embodiments (ex. FIG. 3A) have contact blades 16a extending from male extension 60a, the embodiment of FIG. 7A provides an insulated post, onto which contact blade 216a is mounted. The post, having sections 262 and 264, may be formed as an integral part of the overmold body. As can be appreciated by those skilled in the art, cavity 40a can be modified to include sleeve shaped recesses. Contact blades 216a can be retained at the far end of the recess, in order to overmold the post in a single step, as described in FIG. 2. The same materials can be used for the overmold body and the high strength locking yoke, as described above. In a complementary configuration, female connector 270 provides female contacts 216b, that are disposed more towards the center of the connector 270. Note the buried location of contact 216b, as compared to the position of the contacts in FIG. 3A which is adjacent cavity 70a.

Geometrically, the post has a regular linear form having a length that is greater than the exposed length of the mounted contact. An example of a regular form would be a uniform cross-sectional shape and area that extends for some length greater than the length of the contact. While a square, rectangular or other polygonal cross-sectional area is contemplated within the scope of this invention, a circular cross-sectional area is illustrated. Cylinder section 262 is shown in FIG. 7B that is configured to be received in correspondingly shaped cylinder sleeve 272. At the base of the post, there is a frusto-conical section 264 that is received within a frusto-conical sleeve 274. The frusto-conical section 264 provides added structural support for the post. The frusto-conical sleeve 274 provides a wider opening for cylinder section 262 and guides the various posts into proper axial alignment as the connectors are brought together.

As mentioned, contact 216a is shorter than cylinder sleeve 272, as shown by FIG. 7B. Accordingly, cylinder section 262 must matingly engage cylinder sleeve 272 before male contact 216a reaches female contact 216b. By extending the cylindrical sections, a greater degree of insertion can be achieved before the contacts engage. This buried contact configuration has particular application to live power disconnect situations. When connecting and disconnecting live lines, it is possible have arcing occur between spaced electrical contacts. Individuals or tools may conduct electricity when exposed to arcing. By inserting the cylinder section into the sleeve to form an insultingly sufficient seal, any arcing occurs harmlessly within the limited enclosed sleeve volume.

For a given application like 220-240 volts or higher commercial lighting circuits, determine the maximum gap over which an arc can occur with a given contact (216a, 216b) configuration. Add a safety margin, and then specify that cylindrical section 274 should exceed the length of contact 216a by at least the maximum gap length plus the safety margin. Of course, the tolerance between mating connector parts, can influence under what circumstances it becomes an insulatingly sufficient seal. In a practical embodiment, a contact blade 216a having a length of 0.25 inches is mounted on a post having a cylindrical section 262 over 0.30 inches in length, for example 0.31 inches. The cylindrical section and the cylindrical recess may both have a tooling diameter of 0.2 inches, with the cylindrical section and/or sleeve shrinking slightly as the overmold material cools, thereby allowing a close fit. The cylindrical section should fit snuggly, so that the parts are axially aligned and frictionally engaged, and under a compressive force pushing the connectors toward each other, when the contacts first come into arcing range.

In the same practical embodiment, frusto-conical section 264 had a length in the range of 0.10 to 0.15 inches, for example, 0.125 inches. At its narrower top end, section 264 has the same diameter as the cylindrical section 264, that is 0.2 inches. The cone angle may be between 10 and 20 degrees, for example 15 degrees. The base where section 264 meets male mating extension 260*a* may be between 0.25 and 0.28 inches in diameter, for example, 0.267 inches. The frusto-conical sleeve 274 may be formed from tooling having the same dimensions.

What is claimed is:

1. In a water tight electrical connector assembly having a male connector and a female connector with a mating seal formed cooperatively upon connection of the male connector to the female connector, wherein one of the connectors includes locking tabs and the other connector comprises:
   a locking yoke made from an impact resistant thermoplastic having a bit portion with opposed ends and locking arms integrally formed on either end of the bit portion;
   an electrical contact forming a terminating end of a wire; and
   a dielectric thermoplastic overmold body including a portion of the mating seal at the proximal end thereof and encasing said bit portion and said electrical contacts whereby the locking arms extend outside the body with a degree of flexibility so that the arms are capable of engaging and disengaging the locking tabs on the mating connector.

2. The assembly of claim 1, wherein said bit portion comprises a C shaped retention band that is configured and designed to pass around, and partially encircle, the electrical contacts.

3. The assembly of claim 2, wherein the retention band and the electrical contacts are held in a spaced relationship during formation of the overmold body.

4. The assembly of claim 3, wherein said yoke includes pivot plates between the bar and the locking arms, wherein the pivot plates pass through the exterior surface of the overmold body.

5. The assembly of claim 4, wherein the impact resistant material forming the locking yoke has an tensile strength at yield of between about 7,500 psi to about 10,500 psi according to ASTM D638.

6. The assembly of claim 5, wherein the locking arms are connected to the pivot plates at a midpoint thereof to provide a lever for pivoting the locking arms off of the tabs.

7. The assembly of claim 1, wherein the impact resistant material forming the locking yoke has a tensile strength at yield of between 3 and 20 times greater than the dielectric material forming the overmold body.

8. The assembly of claim 7, wherein the impact resistant material is selected from the group consisting of nylon 66 and polycarbonate, and the dielectric material is selected from the group consisting of PVC, TPR and TPE.

9. The assembly of claim 8, wherein said connectors each include one of a complementary shaped extension or cavity, both having lateral surfaces, and wherein said mating seals are formed on lateral surfaces.

10. The assembly of claim 9, wherein said band bit portion is axially aligned with said lateral surfaces.

11. The assembly of claim 9, wherein said band bit portion is axially aligned with said seal.

12. The assembly of claim 11, wherein said locking arms and said locking tabs engage at a location that is radially aligned with said lateral surfaces.

13. The assembly of claim 1, comprising a post integrally formed with said overmold body and having a free end for supporting said electrical contact.

14. The assembly of claim 13, wherein said post has a length that is greater than the length of said electrical contact.

15. The assembly of claim 14, wherein said post has a section of uniform cross sectional shape and area that is longer than said electrical contact.

16. The assembly of claim 15, wherein said post includes a base section having a frusto-conical shape.

17. The assembly of claim 14, wherein the one connector has a sleeve and female contact correspondingly shaped and dimensioned to receive said post and said electrical contact.

18. The assembly of claim 17, wherein said post occupies the sleeve opening to enclose the contacts before they enter arcing range.

19. The assembly of claim 1, further comprising
   the one connector including a shoulder, at least one step and flexible arms that carry and bias the step outwardly into a face-plate contacting configuration.

20. The assembly of claim 19, wherein said one connector is overmolded with a dielectric material to include a bead extending around the shoulder for sealing engagement with the plate.

21. The assembly of claim 20, wherein said flexible arms carry a stepped profile to increase the pressure of the bead against the plate so that the bead forms an O-ring type seal meeting standard IP65.

22. The assembly of claim 21, wherein the bead comprises a tapered lip about 0.01 inches in height and extending off the shoulder in the direction of the tabs.

23. The assembly of claim 19, wherein said one connector is provided with channels underneath the flexible arms, wherein the flexible arms are adapted to be depressed into the channels to clear the face plate aperture for removal of the one connector.

24. The assembly of claim 23, comprising an attachment assembly having a capture block integrally formed with the flexible arms, and wherein said capture block releasably secures the attachment assembly to the one connector.

25. The assembly of claim 24, wherein said one connector is made from a dielectric thermoplastic material and includes the other portion of the waterproof seal.

26. The assembly of claim 25, wherein said one connector and the other connector are made from the same dielectric material.

27. The assembly of claim 25, wherein said attachment assembly is made from an impact resistant thermoplastic material having a tensile strength at yield of between about 7,500 psi to about 10,500 psi according to ASTM D638.

28. The assembly of claim 27, wherein said locking yoke and said attachment assembly are made from the same impact resistant material.

29. The assembly of claim 27, wherein said capture block includes windows and wherein said one connector includes engagement tabs at a distal end thereof, to latch into the windows of said capture block.

30. The assembly of claim 1, further comprising
   the one connector including a shoulder and ramp tabs adapted to resiliently compress for passing through a face plate aperture and then expand to capture the face plate between the shoulder and the tabs.

* * * * *